United States Patent [19]
Mullan et al.

[11] 3,988,715
[45] Oct. 26, 1976

[54] MULTI-CHANNEL RECOGNITION DISCRIMINATOR

[75] Inventors: Philip J. Mullan, Rockville; Walter S. Rosenbaum, Silver Spring, both of Md.

[73] Assignee: International Business Machines Corporation, Armonk, N.Y.

[22] Filed: Oct. 24, 1975

[21] Appl. No.: 625,618

[52] U.S. Cl. ................ 340/146.3 S; 340/146.3 WD
[51] Int. Cl.² ......................................... G06K 9/00
[58] Field of Search .......... 340/146.3 S, 146.3 WD, 340/146.3 R, 172.5; 444/1

[56] References Cited
UNITED STATES PATENTS

| | | | |
|---|---|---|---|
| 3,839,702 | 10/1974 | Chaires et al. ................ | 340/146.3 S |
| 3,842,402 | 10/1974 | Ett et al. ........................ | 340/146.3 S |

*Primary Examiner*—Leo H. Boudreau
*Attorney, Agent, or Firm*—J. Jancin, Jr.

[57] ABSTRACT

A multi-channel multi-genre character recognition discriminator is disclosed which performs the decision making process between strings of characters coming from a multi-channel (i.e., three or more channels) alpha-numeric output optical character reader (OCR) system for use in such applications as, for example, text processing and mail processing. The multi-channel output OCR uses separate recognition processes for each genre or character set indicative of a distinct group with respect to style (i.e., font) or form, and attempts to recognize each character independently as belonging to each respective genre. For example, in a three channel output OCR for reading mixed numeric, English and Russian Cyrillic character sets, the English alphabetic interpretation of a scanned word is outputted as an English alphabetic subfield on a first OCR output line, the Cyrillic interpretation of the scanned word is outputted as a Cyrillic subfield on a second OCR output line, and numeric interpretation of the scanned word is outputted as a numeric subfield on a third OCR output line. A multi-channel multi-genre character recognition discriminator analyzes these three subfield character streams by calculating a first conditional probability that given the OCR has scanned and recognized an English alphabetic character $E_i$, the probability that numeric $N_K$ and Cyrillic $C_J$ characters were respectively misrecognized by their recognition channels; a second conditional probability that given the OCR has scanned and recogized a Cyrillic character $C_J$ the probability that numeric $N_K$ and English $E_i$ characters were respectively misrecognized by their recognition channels; and a third conditional probability that given the OCR scanned and recognized a numeric character $N_K$, the probability that English $E_i$ and Cyrillic $C_J$ characters were respectively misrecognized by their recognition channels. These conditional probabilities are developed character by character for each character within a string thereof or a word. A first product of all the first type conditional probabilities is calculated for all of the characters in a word (which may, of course, contain only a single character); similarly second and third products are calculated for the second and third conditional probabilities, respectively. The magnitudes of the products of these conditional probabilities are then compared in an N-channel comparator, and the highest probability subfield is selected as the most probable interpretation of the word scanned by the OCR.

13 Claims, 11 Drawing Figures

MULTI-CHANNEL RECOGNITION DISCRIMINATOR

FIELD OF THE INVENTION

The invention disclosed herein relates to data processing systems of the type described and claimed in U.S. Pats, Nos. 3,839,702 and 3,842,402, for the analysis of alpha-numeric type character streams outputted from an optical character reader.

OBJECTS OF THE INVENTION

It is an object of the invention to process in an improved manner three or more genre character sets outputted along three or more OCR channels respectively.

It is another object of the invention to process textual data outputted along three or more channels of an OCR in an improved manner.

It is a further object of the invention to discriminate between multiple genre alphabetic and numeric character subfields scanned by an OCR without the need of a stored dictionary of permissible received messages known in advance.

It is a still further object of the invention to distinguish between multiple genre alphabetical and numerical subfields outputted from an optical character reader in a shorter period of time than that achieved in the prior art.

DESCRIPTION OF THE DRAWINGS

The foregoing and other objects, features, and advantages of the invention will be apparent from the following more particular description of the preferred embodiments of the invention, as illustrated in the accompanying drawings.

BACKGROUND OF THE INVENTION

Historically, the alphabetic symbols employed in the English language evolved from the written representation of speech sounds developed by the Romans whereas the numerals employed in the English and other Western languages were developed by the Arabians for the written representation of numbers. With a few exceptions, the alphabet and the numerals employed in the English language were developed quite independently. This has led to the use of identical or very similar character shapes for English alphabetic and numerical representations. Similarly, and by way of example, the alphabetic symbols developed for the Russian Cyrillic or Japanese Kanji alphabets were independently developed and have used some similar character shapes to English character representations. Visual examples of alphabets with differing character sets sharing similar geometries appear in the alphabet table on page 26 of Webster's Seventh New Collegiate Dictionary published by G. & C. Merriam Company of Springfield, Massachusetts.

The same type of thing appears to hold for the similarity in appearance of corresponding characters in different fonts; for example, A in the Advocate font as compared with another character A in the Script font. Where the user (i.e., reader) of the character representations is a human being, judgment can be employed in analyzing the context and alphabetic form (e.g., English v. Cyrillic or Script Font) within which the character appears, thereby reducing the likelihood that the intended meaning of the writer will be confused. However, with the development of OCR machines for reading multi-genre character data from machineprinted, typed, or hand-printed documents, the confusing similarity between characters from different alphabets, fonts and numerical symbols (i.e., from differing genre) becomes critical.

Referring to FIG. 1, the case of a three channel OCR is shown for reading an example of mixed English and Russian Cyrillic and numeric characters representing several different categories of alphanumeric character problem pairs and triads. It is clear that the lines between categories are not always sharply drawn. Although confusions such as are illustrated do not always occur, they do occur frequently enough to seriously impede the reduction of printed or typed or handwritten text to a computerized data base. FIG. 1a depicts such primary confusions as the numeral 0 to the English letter o and the numeral 1 to the letter I (sans serif). These characters are usually indistinguishable in a multifont environment. FIG. 1b displays character pairs such as the numeral 5 and the letter S; the numeral 2 and the letter Z; the English and Russian Cyrillic letters W and Ш, respectively; and the letters Y and Ч, which are topologically similar and are only distinguishable by the sharpness of corners which is one of the first attributes to disappear as print quality degrades. FIG. 1c illustrates character triads such as the numeral 6 and letters G and Ь ; the numeral 8 and the letters B and З ; and the numeral 9 and the letters g and Я, which differ in only very minor topological features that tend to disappear under moderate conditions of print quality degradation. FIG. 1d illustrates such character triads as the numeral 4 (with open top) and the letters H and И ; the numeral 4 (with closed top) and the letters A and А ; the numeral 7 and the letters Y and Ч ; the numeral 8 and the letters S and Ь; and the numeral 8 and the letters e and E, which differ somewhat more than is shown in FIG. 1c, but which still become confused with the degree of degradation commonly present in typewritten text. FIG. 1e displays such character triads as the numeral 7 and the letters T and Г; the numeral 0 and the letters N and Ф; the numeral 0 and the letters C and С; and the numeral 9 and the letters U and Ц, which differ by parts that are often lost because of a cocked typeface or because of a failure of the character segmentation circuitry in the OCR to operate perfectly in the separation of touching characters.

The key to reliable text processing is the ability to readily and reliably delineate genre to genre subfields at the earliest phases of pre-analysis of the OCR output. Reliable discrimination of genre subfields in a multi-genre recognition environment is a very complex process, stemming from the fact that, among other things, the most modern character sets were generated and created independently with no attempt to avoid mutual confusion. Different alphabets therefor share many of the same basic geometric shapes. The genre to genre character discrimination problem at the character recognition level, shown itself on the subfield level during OCR postprocessing. For example, in a three channel OCR application as discussed above, many common English alphabetical words can be recognized erroneously, in part or in whole, as either numeric or Russian Cyrillic subfields. Examples of such misinterpretations are "South" into "80478", "804TH" or " ЬОЦТН "; "Third" into "781rd"; and " ВЕЛИ " into "BEAN" or "88th". The crux of the postprocessing problem in subfield discrimination is that real or aliased character strings do not readily lend themselves to methods of direct contextual analysis. For example, a numeric subfield is completely nonredundant, and any set of numeric digits creates a meaningful data set.

In existing two-channel OCR systems other than those described in aformentioned U.S. Pats. Nos. 3,839,702 and 3,842,402, the final alphabetic-numeric discrimination of each subfield is determined by the process of elimination. This requires that an alphabetic recognition stream corresponding to each subfield is to be processed for match against a stored dictionary of permissible received messages known in advance. Any subfields not matched are designated numeric. However, and by way of example, in a national encoding environment such as mail processing applications, or in general text processing, this approach is clearly not feasible since the dictionary of permissible received messages would be excessively large and the time required for the multiple access of that dictionary becomes prohibitive. Clearly such an approach would not be feasible for a greater-than-two output multi-channel OCR system.

It will be recognized by those persons skilled in this art that the term "genre" as used herein not only encompasses differing alphabetic and numeric character sets, but differing type font delineations as well whether handwritten or printed. As indicated previously, the term is used as being indicative of a distinctive character set group with respect to style or form.

SUMMARY OF THE INVENTION

The subject multi-channel multi-genre character recognition discriminator performs a genre decision-making process as among three or more strings of OCR outputted characters. The system comprises an OCR machine adapted to scan a string of characters in a character field; a means for output on a first OCR output line with respect to a first character set (e.g., alphabetic English) for genre-1 which most nearly matches each character scanned as a genre-1 alphabetic field for all characters scanned; a means for an output on a second OCR output line with respect to a second character set (e.g., alphabetic Russian Cyrillic) for genre-2 which most nearly matches each character scanned as a genre-2 alphabetic field for all characters scanned; a means for an output on a third OCR output line with respect to the character set for a genre-3 which most nearly matches each character scanned as a genre-3; and so on for each genre if there were more than three, including a means for an output on an nth OCR output line for a numeric character which most nearly matches each character scanned as belonging to a numeric field for all characters scanned. A first storage address register is connected to the first OCR output line for sequentially storing each genre-1 alphabetic character in the alphabetic field outputted on the first OCR output line. Similarly, a second storage address register is connected to the second OCR output line for sequentially storing each genre-2 alphabetic character in the alphabetic field outputted on the second OCR output line. Correspondingly, this approach holds for each genre including a nth storage address register which is connected to the nth OCR output line for sequentially storing each numeric character in the numeric field outputted on the nth OCR output line.

Another storage means which is connected to each aforementioned storage address register, will have stored therein a set of N-dimensional matrices of joint conditional probabilities which quantify events of the form such that given that a genre-1 alphabetic character was inferred by the OCR, certain characters were respectively misrecognized for all combinations of each of the other respective genre of alphabetic and numeric characters. Corresponding joint conditional probabilities for each genre are stored in the storage means which is accessed by an N-dimensional address formed uniquely by the contents of the successive storage address registers to yield the joint conditional probability that the genre-1 character stored in the first storage address register was misread by the OCR as the specific genre-2 character stored in the second storage address register, and as the specific genre-3 character stored in the third storage address register, and so on, depending of course upon the number of genre in the system.

The storage means is accessed for each character in the first address register yielding through a multiplier means the product of joint conditional probabilities for genre-l. Similarly, the storage means is accessed for each character of the other address registers to develop the product of joint conditional probabilities for genre-2, genre-3, and so on for each additional genre. A comparator is connected to the multiplier means for comparing the magnitudes of the products of the joint conditional probabilities The output of the comparator is used to gate the OCR output lines so as to select, in keeping with the largest product, the correct genre character data set for purpose of data transmission.

The multi-channel recognition discriminator is thus capable of discriminating between multiple genre alphabetic and numeric character subfields scanned by an OCR without the need for a stored dictionary of permissible received messages known in advance. Accordingly, and without the necessity of a dictionary, the genre to genre distinction whether it be style or form or font can be made in a shorter period of time than that achieved heretofore.

DISCUSSION OF THE PREFERRED EMBODIMENT

Theory of Operation for the Multi-Channel Multi-Genre Alpha-Numeric Recognition Discriminator (MCRD): The methodology of the MCRD seeks to achieve the genre to genre inference capability by associating with a genre subfield a certain form of quasi-redundancy. Redundancy in a contextual sense means dependencies exist between the presence of one character and another. Normally contextual redundancy is considered in a horizontal sense between characters on a line and within a word. An example of this concept is digram statistics. These probabilities of character juxtaposition combinations allow the projection of likely succeeding characters from knowledge of the preceding one. Hence, if given the English alpha string "SPRI-G"; N would be chosen over Z, for example, to fill the blank position. This matter is discussed conceptually and mathematically in considerable detail in aforementioned U.S. Pat. Nos. 3,839,702 and 3,842,402.

Although redundancy of the horizontal form does not exist for numeric subfields, redundancy of a special "vertical" nature does exist; for example in using a three channel OCR to scan a Russian language newspaper having an article on "President Gerald Ford 1600 Pennsylvania . . .", the OCR system might provide the following where an "*" depicts the absence of character recognition:

| English ALPHA Channel No. 1: | PRESI*ENT | GE*ALD FORD 1*00 |
|---|---|---|
| Russian ALPHA Channel No. 2: | РВЕЪ *ГЕМГ | СЕРА *Д*О** *ЬОО |
| Numeric Channel No. 3: | 4*840*457 | 68*4*0 *0*0 1600 |

A concept of vertical redundancy is developed here which associates the recognition of a character in one channel with one of a set of misrecognitions possible in the other channels. The basic unit upon which the MCRD is based is the Multi-Channel Confusion Probability, $P_{MCC}$. The general form of the $P_{MCC}$ is:

$$P_{MCC}(r) = P(\alpha_i, \beta_j, \Psi_k, \ldots, \pi_1 | \gamma_m) \quad \text{Eq. (1)}$$

where: $\alpha$, $\beta$, $\Psi$, etc., represent the respective genre character sets or fonts over which the multi-channel OCR performs recognition processing.

Subscripts $i$, $j$, $k$, and so on, represent the index of legal character recognitions in each of their respective alphabets, recognizing of course that an independent OCR recognition channel and logic are allotted to each genre character set. Equation (1) expresses the probability of observing the joint (i.e., simultaneous) recognition of: $\alpha_i$ in the $\alpha$ channel, $\beta_j$ in the $\beta$ channel, . . . (and) $\pi_1$ in the $\pi$ channel, given the assumption that a subfield in the $\gamma$ alphabet was actually scanned and $\gamma_m$ recognized by that recognition logic. In other words, conditioned on the occurrence of $\gamma_m$, equation (1) can be evaluated over all characters in the $\alpha$, $\beta$, $\gamma$, . . . , and $\pi$ alphabets. This yields an N-dimensional matrix of probability factors which gives the likelihood of each character of the alphabet being misrecognized by the other N-1 recognition channels as any combination of their respective characters.

The probabilistic relationship expressed in the form of equation (1) differs mathematically from the single factor conditional probabilities utilized in the embodiments disclosed in U.S. Pat. Nos. 3,839,702 and 3,842,402 for dual channel alpha-numeric genre inference and denoted in general by $P(\alpha|\gamma)$. Referring to (1) M. G. Kendall — The Advance Theory of Statistics — VOlume I; Charles Griffin & Co., page 301; and (2) Tung Au — Fundamentals of Systems Engineering Probabilistic Model; Addision Wesley, page 276; it can be shown that $P(\alpha|\gamma)$ relates to a regression model of the form:

$$\alpha = E(a + b\gamma) \quad \text{Eq. (2)}$$

where E stands for Expected Value and where $a$ and $b$ are constants solved for by using least square regression theory. In contrast, and by way of example, the joint conditional probability statement $P(\alpha,\beta|\gamma)$ relates to:

$$P(\alpha, \beta | \gamma) = P(\alpha|\gamma) \cdot P(\beta|\alpha, \gamma) = E(a + b\gamma) \cdot E(c + d\alpha + 1\gamma) \quad \text{Eq. (3)}$$

Comparing the constituent elements of equations (2) and (3) indicates that no combination of simple conditional probability factors can yield in general a resultant expression which has the inference properties or value of a joint conditional probability. Hence no teaching in, nor manipulation of the mechanism described in, the specification of the above-mentioned patents can yield the desired result achieved using the MCRD circuit embodiment of the subject invention.

For an N-channel OCR there are N-1 additional joint conditional probabilities which serve as the counterparts of equation (1) for the other recognition channels. Each joint conditional probability expression is respectively conditioned upon a different channel's legal recognition alphabet. The related probability factors are stored for each channel as an N-dimensional matrix whose entries relate a recognition in one alphabet with the likelihood of its video image being respectively misrecognized by the other recognition channels. This is displayed diagrammatically in FIGS. 2a–2c wherein a probability factor storage configuration shows the matrix data arrangements required for the three channel MCRD configuration.

Figure 1A:
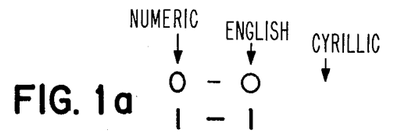
FIGS. 1a–1e depict exemplary genre to genre character problem pairs and triads.
Figure 1B:
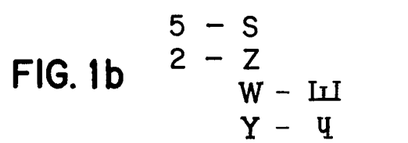
Figure 1C:
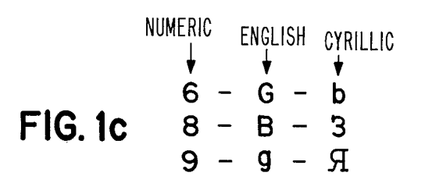
Figure 1D:
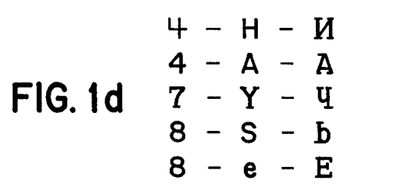
Figure 1E:
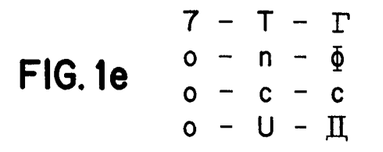
Figure 2A:
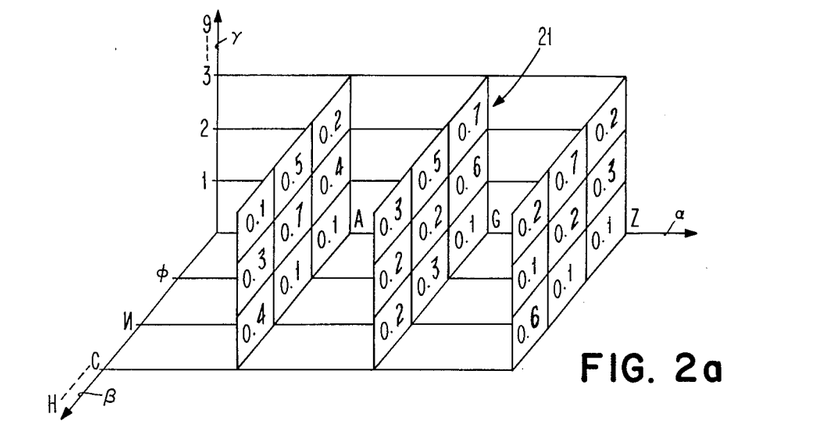
FIGS. 2a–2c display diagrammatically a probability factor storage configuration for a three channel English alpha, Russian Cyrillic alpha, and numeric application of the subject invention.

Referring to FIGS. 2a–2c, the $\alpha$ conditioned axis is associated with the English alphabet character OCR output line; the $\beta$ conditioned axis is associated with the Cyrillic alphabet character OCR output line; and the $\gamma$ conditioned axis associated with the numeric OCR output line. The diagrammatic representation in FIG. 2a displays that given an English alphabetic character inferred by the OCR along the one of its output lines designated $\alpha$, it could have been misrecognized for all combinations of each of the Cyrillic and numeric characters in keeping with pre-designated joint conditional probabilities. For example, given that an English G character has been inferred by the OCR, the 2-dimensional probability values in matrix 21 will be available for access. ANd, more particularly, given that a Cyrillic character Ь was inferred by the OCR along the $\beta$ OCR output line, and given that a numeral 6 was inferred by the OCR along the $\gamma$ OCR output line, the joint conditional probabilities value at the $\beta - \gamma$ intersection would be accessed. To continue with the explanatory example, if the numeral inferred by the OCR on the $\gamma$ output line were an 8, the joint conditional probability value at the $\beta = $ Ь/G8 intersection would be accessed.

Figure 2B:
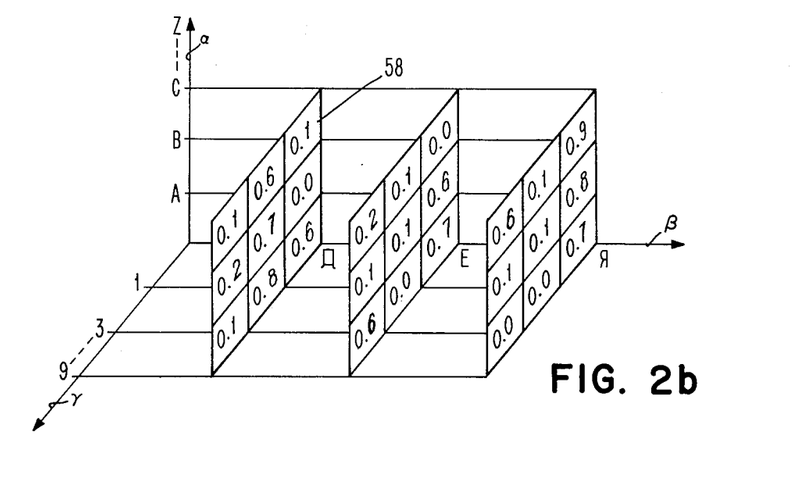
Figure 2C:
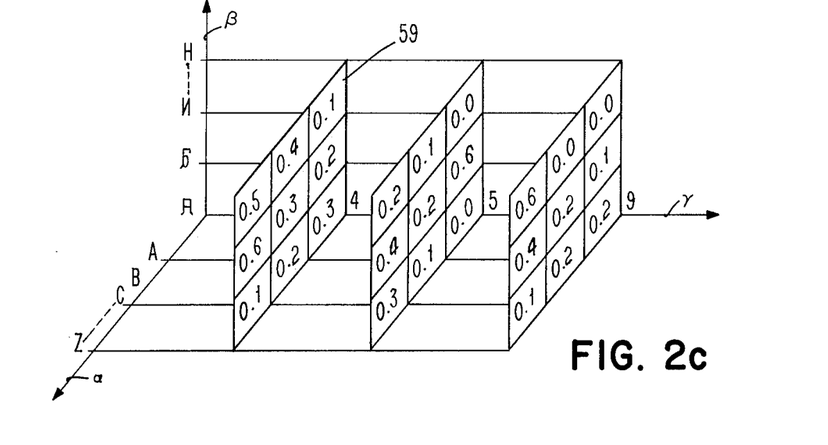

In a similar way, and referring to FIG. 2b, a Cyrillic character Ь inferred by the OCR for transmission along the $\beta$ line, an English character G on the $\alpha$ line, and a 6 on the $\gamma$ line, would access the joint conditional probability value at the $\alpha - \gamma$ intersection. Referring to FIG. 2c, a 6 along the $\gamma$ line, an English character G on the $\alpha$ line, and a Cyrillic character Ь on the $\beta$ line, will access the joint conditional probability value at the $\beta - \alpha$ intersection.

When a subfield has been scanned and at least two channels have an output with a recognition quality that makes the genre of the subfield ambiguous, then the MCRD is entered and the $P_{MCC}$ matrices are accessed. For each channel, with respect to which the subfield's genre is ambiguous, a product is compiled using the $P_{MCC}$ factors conditioned on the output of that channel and reflecting the corresponding outputs of the other channels. The subfield genre decision is made so as to reflect that channel upon which was conditioned the $P_{MCC}$ product that yielded the highest probability score.

The foregoing discussion of the MCRD in terms of an N-channel OCR is the most general configuration possible. However, to clarify implementation of the MCRD, it should be recognized that it may also have application with respect to a multi-font application — e.g., a nonformatted Japanese OCR which reads the Katakana as well as the Romnji alphabets. Since Romnji contains what is nominally the Roman and Arabic (numeric) character sets, the Japanese OCR would require three independent recognition channels. Persons skilled in this art are aware that such a Katakana and Romnji OCR capability is already within the state-of-the-art recognition technology in both the United States and Japan. If recognition processing were performed in multi-channel mode, the interchannel alphabet character confusions would be described by three $P_{MCC}$ equations. Accordingly, if K represents the Katakana alphabet, and $R_A$ and $R_N$ represent the Romnji alpha and numeric character sets, respectively, the $P_{MCC}$ equations are as follows:

$$P_{MCC}(K) = P(R_{A_e}, R_{N_j} \mid K_1) \qquad \text{Eq. (4)}$$

$$P_{MCC}(R_A) = P(R_{N_j}, K_1 \mid R_{A_i}) \qquad \text{Eq. (5)}$$

$$P_{MCC}(R_N) = P(K_1, R_{A_i} \mid R_{N_j}) \qquad \text{Eq. (6)}$$

where $j$, $i$ and $l$ are dummy variables which vary over the legal character identifications in the recognition alphabets to which they are respectively related.

Equations (4)–(6) are applied as follows, assuming a video image has turned on: (1) a Katakana symbol (herein designated K); (2) the Romnji numeric 7; and (3) the Romnji alpha T. Then:

$$P_{MCC}(K) = P(T, 7 \mid K) \qquad \text{Eq. (7)}$$

$$P_{MCC}(R_A) = P(7, K \mid T) \qquad \text{Eq. (8)}$$

$$P_{MCC}(R_N) = P(K, T \mid 7) \qquad \text{Eq. (9)}$$

Equation (7), for example, expresses the probability that given the scanning of a Katakana subfield and recognizing a video image as K, how likely is it that that video image would turn on a T in the $R_A$ logic and a 7 in the $R_N$ logic. Equations (8) and (9) relate to similar probability statements where the assumption re equation (8) is that the subfield is Romnji alpha, and where the assumption re equation (9) is that it is Romnji numeric.

When equations (4)–(6) are evaluated over all characters in their respective recognition alphabets, each yields a separate three-dimensional matrix. A 30 × 11 × 150 character matrix is required to store the probability datum which is accessed as in equations (7)–(9).

The MCRD is entered when a subfield is scanned and its recognition output is ambiguous as in the following Example (1) because all three channels are candidate genre:

| Katakana channel: | K1-K2-K3 | |
| --- | --- | --- |
| Romnji alpha channel: | C-A-T | Example (1) |

| | | |
| --- | --- | --- |
| Romnji numeric channel: | 0-4-7 | |

The same holds true when only the Katakana and the Romnji alpha channels are candidate genre as follows in Example (2):

| Katakana channel: | K4-K5-K6 | |
| --- | --- | --- |
| Romnji alpha channel: | C-A-T | Example (2) |
| Romnji numeric channel: | *-4-* | |

It should be noted that the K, K1, K2, etc., notations identify different Katakana symbols which bear a video semblence to the respective Romnji characters indicated, and that they're so designated herein for ease of written communications.

The MCRD must discriminate between three options in the Example (1) of multi-channel confusion and between two genre options in Example (2). The MCRD decision follows by examining the contending channels in terms of the $P_{MCC}$ value they yield. If L denotes the product of $P_{MCC}$ probabilities on a character by character basis then:

In Example (1):

$$L \text{ (Katakana)} = P(C, 0 \mid K1) \cdot P(A, 4 \mid K2) \cdot P(T, 7 \mid K3)$$

$$L \text{ (Romnji alpha)} = P(0, K1 \mid C) \cdot P(4, K2 \mid A) \cdot P(7, K3 \mid T)$$

$$L \text{ (Romnji numeric)} = P(K1, C \mid 0) \cdot P(K2, A \mid 4) \cdot P(K3, T \mid 7)$$

and
In Example (2):

$$L \text{ Katakana)} = P(C, * \mid K4) \cdot P(A, 4 \mid K5) \cdot P(T, * \mid K6)$$

$$L \text{ (Romnji alpha)} = P(*, K4 \mid C) \cdot P(4, K5 \mid A) \cdot P(*, K6 \mid T)$$

The subfield genre decision is determined by the largest value of L.

Analogous to the use of the MCRD for multi-alphabet genre discrimination, is its application for interfont discrimination. A multi-channel OCR consisting of a series of parallel recognition logics wherein each is optimized for the character shape and segmentation idiosyncrasies of a different font. In this vein, a likely configuration would be, for example, an OCR-A font channel, an OCR-B font channel, an Advocate font channel, an Orator font channel, and a Script font channel. The relatively varied character shapes of the above fonts along with additional examples appear in a pamphlet entitled "IBM 'Selectric' Typewriter Type Styles" which has been published by the Office Products Division of the IBM Corporation.

The recognition logic of each of the respective channels is adapted to its particular font. The problem addressed by the MCRD is to determine from the output of the respective recognition channels the actual nature of the font being scanned. Based upon the MCRD font decision, the related recognition channel's output would be processed as the most reliable recognition of the scanned data. The MCRD font decisions would normally be made on a subfield basis.

By way of further example, assume OCR scanning of the Script font characters *a* and *b:* An output of the respective recognition channels might be as follows (where an asterisk "*" denotes a reject recognition):

| OCR-A channel | N* | . | . | . | . | . . |
|---|---|---|---|---|---|---|
| OCR-B channel | A S | . | . | . | . | . |
| Advocate channel | V S | . | . | . | . | . |
| Orator channel | X B | . | . | . | . | . |
| Script channel | A B | . | . | . | . | . |

The MCRD would evaluate the joint conditional probability events using empirically derived and prestored $P_{MCC}$ probability factors conditioned on the respective fonts. For the example above this follows as:

$L(OCR\text{-}A) = P(A_{OCR\text{-}B}, V_{Advocate}, X_{Orator}, A_{Script} \mid N_{OCR\text{-}A}) \times P(S_{OCR\text{-}B}, S_{Advocate}, B_{Orator}, B_{Script} \mid *_{OCR\text{-}A})$ $L(OCR\text{-}B) = P(N_{OCR\text{-}A}, V_{Advocate}, X_{Orator}, A_{Script} \mid A_{OCR\text{-}B}) \times P(*_{OCR\text{-}A}, S_{Advocate}, B_{Orator}, B_{Script} \mid S_{OCR\text{-}B})$ $L(Advocate) = P(N_{OCR\text{-}A}, A_{OCR\text{-}B}, X_{Orator}, A_{Script} \mid V_{Advocate}) \times P(*_{OCR\text{-}A}, S_{OCR\text{-}B}, B_{Orator}, B_{Script} \mid S_{Advocate})$ $L(Orator) = P(N_{OCR\text{-}A}, A_{OCR\text{-}B}, V_{Advocate}, A_{Script} \mid X_{Orator}) \times P(*_{OCR\text{-}A}, S_{OCR\text{-}B}, S_{Advocate}, B_{Script} \mid B_{Orator})$ $L(Script) = P(N_{OCR\text{-}A}, A_{OCR\text{-}B}, V_{Advocate}, X_{Orator} \mid A_{Script}) \times P(*_{OCR\text{-}A}, S_{OCR\text{-}B}, S_{Advocate}, B_{Orator} \mid B_{Script})$ The font/channel decision by the system would reflect the highest probability yielded by the above expressions which, for the example of Script font characters *a* and *b*, would be the L(Script).

Multi-Channel Recognition Discriminator Apparatus: The multi-channel output OCR 22 used in the three channel MCRD embodiment, is shown in FIGS. 4A and 4B. In general text processing the printed matter on the document 23 (see also FIG. 3) undergoes a search scan function performed by the search scanner 24 which consists of the prescan and format processing function. The prescan consists of collecting digital outputs from the optical scan arrays in the search scanner 24 and transferring them to the format processor 25. The format processor takes the digital outputs and performs the line find and, by way of example with respect to mail processing operations, the address find functions. The line find function determines the horizontal and vertical coordinates of all potential text lines and generates the geometric coordinates necessary for the processor to calculate the location and skew of the text. In mail processing applications, the address find function determines the best address block on the mail piece and supplies the horizontal and vertical start positions and skew data for the read scan section. The output from the arrays in read scanner 26 are digitized and sent to the video processor 27 for every prescribed distance (e.g., 0.004 inches) of document travel. The video processor 27 performs three major functions: video block processing, character segmentation and character mormalization. The video block processing tracks the print line and stores the video for that line. It computes the character pitch for each video line and transfers it to the character segmenter and normalizer 28. The normalizer adjusts the height of the characters by deleting or combining horizontal rows of the video read. It reduces the width of the characters by deleting or combining vertical scans of the video. The resulting digital scan is then sent to the feature detector 29.

Character recognition is performed by using a measurement extraction process on the video data imputted to the feature detector 29, followed by a decision phase. The measurement extraction phase determines the significant identifying features of the character from the video shift register contents. Each measurement (e.g., a lower left horizontal serif, an open top, and a middle bar) is stored as a bit in a specific location of a register, and is called the measurement vector which, in turn, is outputted from the feature detector 29 to the English alphabetic feature comparator 31, the Cyrillic alphabetic feature comparator 32, and the numeric feature comparator 33. The feature comparator 31 compares the measurement vector for the character under examination with the measurement vector for the alphabetical characters whose features are stored in alphabetical feature storage 34. The English alphabetical characters whose features most closely compare with the features of the character scanned, are outputted on the alphabetic character subfield line 35. Similarly, the feature comparator 32 compares the measurement vector outputted from the feature detector 29 for the character scanned, with Cyrillic alphabetic characters whose features are stored in the feature storage 36. The feature comparator 32 outputs on line 37 those Russian characters whose features most clearly match the features of the character scanned. Similarly, for each channel this process is repeated through the nth channel which for purpose of explanation herein is the third channel designated numeric whose feature comparator 33 in function with storage 38 outputs on line 39. If a minimum threshold of feature matches is not met in the feature comparator of a given channel, a reject symbol is outputted on that respective OCR output line. Sample alphabetical character subfields 41 and 42, and the corresponding numeric character subfield 43 which could be outputted from the multi-channel output OCR are shown in FIG. 3.

Figure 3:
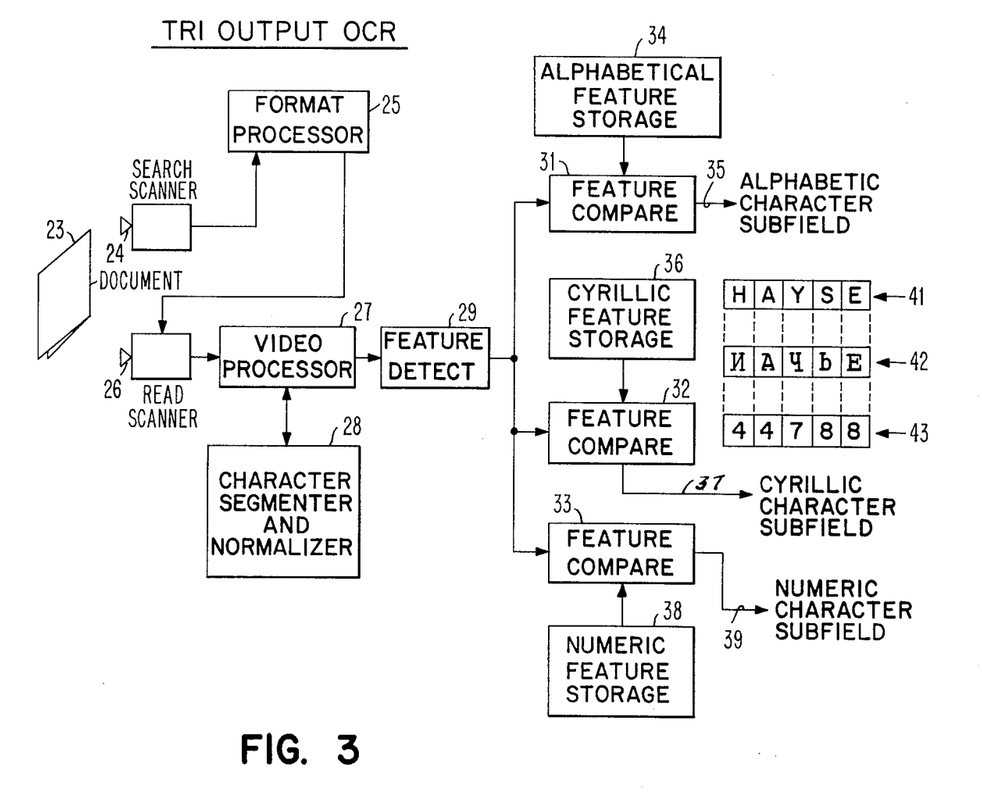
FIG. 3 is a block diagram of the multi-channel tri-output OCR.
Figure 4A:
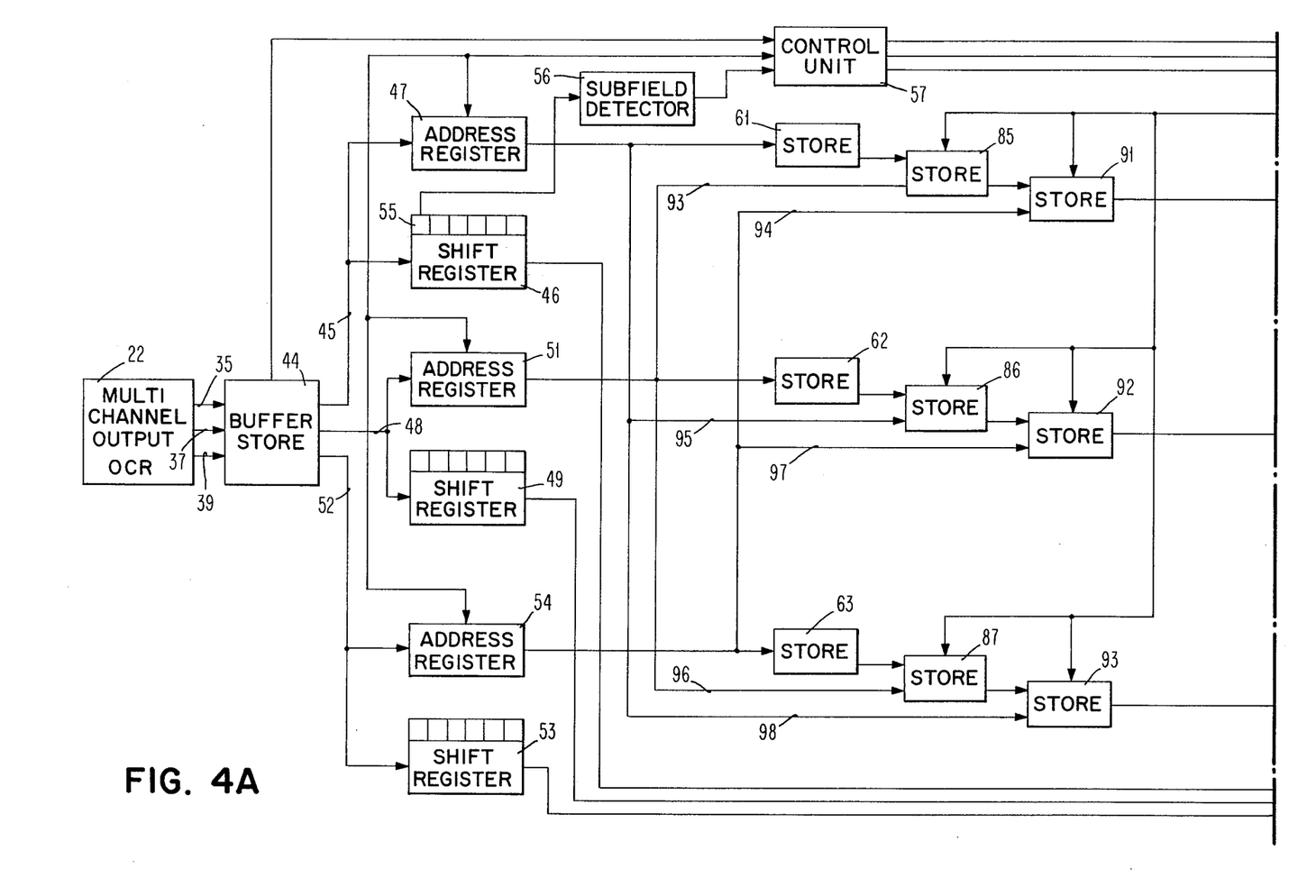
FIGS. 4A and 4B provide a detailed block diagram of a multi-channel multi-genre alpha-numeric discriminator with a multi-channel comparator.
Figure 4B:
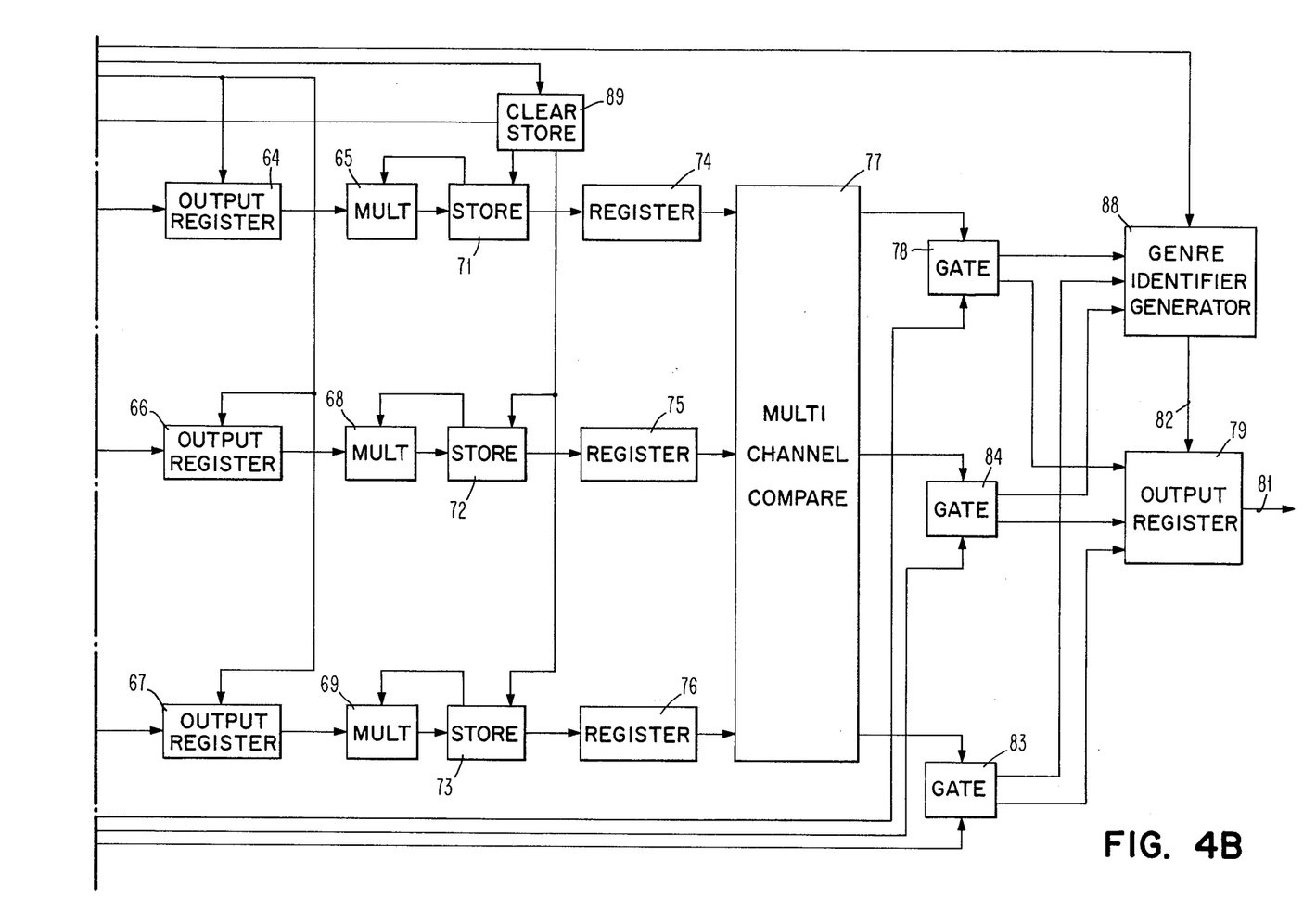

Referring to the MCRD system in FIG. 4, the OCR output in FIG. 3 is displayed in FIG. 4 as being available from OCR 22. Line 35 is the English alphabetic character subfield OCR output line; line 37 is the Russian Cyrillic character subfield OCR output line; and line 39 is the numeric character subfield OCR output line. Each line is connected to the buffer storage 44, from which the English alphabetic character subfield is outputted on line 45 to the alphabetic shift register 46 and the storage address register 47. The Russian alphabetic character subfield is outputted on line 48 to the shift register 49 and the storage address register 51, while the numeric output from the buffer storage 44 is outputted on line 52 to the shift register 53 and the storage address register 54. At the input cell 55 for shift register 46, a line is connected to the subfield detector 56 for testing for the presence of a blank or word separation character. On detection of a blank, the decision process is activated by the control unit 57.

Upon detection of a blank at the input cell 55 of shift register 46, the control unit 57 causes the English alphabetic subfield character stream to be shifted into the shift register 46 a character at a time in synchronism with the Russian Cyrillic alphabetic subfield characters which are shifted a character at a time into the shift register 49 and the numeric subfield characters which are shifted into the shift register 53 a character at a time. At the same time that each character in the English alphabetic character subfield is sequentially loaded into the storage address register 47, simultaneously each character in the Russian and numeric subfield character streams are loaded sequentially into their respective storage address registers 51 and 54. The English alphabetic character stored in the storage address register 47, the Russian alphabetic character stored in the storage address register 51, and the numeric character stored in storage address 54, embody in combination, the storage addresses for the three appropriate joint conditional probabilities ($P_{MCC}$) to be accessed from storage means 61, 62 and 63.

The accessing processes performed upon said storage means 61–63 is multi-dimensional (i.e., 3-dimensional). It utilizes the character data stored in respective storage address registers 47, 51 and 54 to successively reduce the dimensionality of the access till the required probability factor $P_{MCC}$ is retrievable by performing a simple (i.e., one dimensional) list look-up procedure. In an N-genre discriminant configuration this accessing process is performed N times. The three logically separate $P_{MCC}$ stores are depicted in FIG. 2 to be resident in storage means 61–63. They differ organizationally by virture of the axis (i.e., alphabet) upon which their $P_{MCC}$ factors are conditioned — e.g., $\alpha$ which is associated with means 61, $\beta$ with means 62, and $\gamma$ with means 63. The sequence of operations in FIG. 4 follows such that when the storage address registers 47, 51, 54 being used as a conditioned axis has denoted a match, a data storage subset of N-1 dimensions is isolated. At this point one of the remaining storage address registers 47, 51, 54 is chosen to index its respective axis of the now logically reduced N-1 dimension store until a match is achieved and the dimensionality of the subject $P_{MCC}$ data store is thereby further logically reduced by another dimension. This process is followed recursively for each of the respective storage address registers. Each time upon a match the dimensionality of the associated $P_{MCC}$ store is reduced by one degree. In FIG. 2, this can be conceptualized as the delineation from a cube (3-dimensional store), a surface (2-dimensional store), and from a surface to a line (1-dimensional store). The last storage address register performs a simple one dimensional list look-up which terminates with the output of the appropriate $P_{MCC}$ value. In light of the above geometric conceptualization, this corresponds to selection of a point on a line.

The accessed $P_{MCC}$ factors are stored in three 3-dimensional storage means 61–63. The probability values stored in storage means 61 correspond to a Russian $R_j$ character and numeric $N_K$ character having been respectively misrecognized by their channels given that an English alphabetic character $E_i$ was actually scanned (see also FIG. 2a). The $P_{MCC}$ statistic relating to the joint conditional probability that a numeric $N_K$ character and an English $E_i$ were respectively misrecognized by their channel given that a Russian $R_j$ character was actually scanned, is stored in storage means 62 (see also FIG. 2b). Correspondingly, storage means 63 contains those statistics relating to the joint conditional probability that a Russian $R_j$ character and an English $E_i$ character were respectively misrecognized by their channels given that a numeric $N_K$ was actually scanned (see also FIG. 2c).

The joint conditional probability values $P_{MCC}$ sequentially stored in the storage output register 64, are sequentially multiplied in multiplier 65. The multiplication process continues in chain fashion until the product of all the English alphabetic joint conditional probabilities has been calculated for the English alphabetic character subfield stored in the shift register 46, the end of which is detected by testing for the terminating blank at the input cell position 55 of the shift register 46. In similar fashion for each of the other subfields and their respective joint conditional probabilities in output registers 66 and 67, the product of the joint conditional probabilities $P_{MCC}$ is sequentially calculated by the multipliers 68 and 69, respectively, and stored in means 72 and 73. The end of each subfield is detected at the input cell location 55 of the shift register 46. The product of the English alphabetic conditional probabilities stored in storage means 71 is transferred to the register 74. The products of the other joint conditional probabilities stored in the storage means 72 and 73 are each transferred to registers 75 and 76. The contents of registers 74, 75 and 76 are compared for relative magnitude in the N=3 channel comparator 77.

The comparator 77 determines which of the products from among the product of numeric conditioned $P_{MCC}$ probabilities, or the product of the English alphabetic conditioned $P_{MCC}$ probabilities, or the product of the Russian alphabetic conditioned $P_{MCC}$ probabilities is greatest. By way of example, in the event the English alphabetic character conditional probability is higher, this indicates that the numeric characters on numeric line 19 and the Russian characters on line 18 are more compatible with the assumption that English alphabetic characters on alpha line 35 were scanned and aliased as numeric and Russian characters than the converse. Stated another way, the respective English alphabetic characters are more compatible with the assumption that either the numeric or Russian characters were scanned and aliased as English alphabetic characters. If it is more probable that the word scanned is the English subfield stored in the shift register 46, the comparator 77 activates gate 78 so as to cause the shift register 46 to output the English subfield to the output register 79, making the English subfield available for output on line 81 for transmission and further post processing. An English alpha flag may also be introduced into the output stream by line 82.

Alternately if the product of the numeric joint conditional probability stored in the register 76 is greater than the product of either of the alphabetic conditional probabilities stored in registers 74 and 75, the comparator 78 would activate the gate 83, thereby causing the numeric character subfield stored in shift register 53 to be outputted to the output register 79 and on the output line 81 for transmission and further post processing. A numeric flag generated in unit 88 may be introduced in the output stream on line 81 along line 82 and through register 79. Similarly, if the output character or word on line 81 is English alpha or Russian Cyrillic, a corresponding flag, again generated in unit 88, may be introduced in the output stream on line 81.

Similarly, if the product of the Russian alphabetic joint conditional probability stored in register 75 is greater than the product of either of the numeric or English alpha conditional probabilities stored in registers 74 and 76, comparator 77 would activate gate 84 so as to cause the Russian character subfield stored in shift register 49 to be directed to the output register 79 for output on line 81 for transmission and further post processing.

The MCRD system described herein can be modified without departing from the spirit and scope of the invention disclosed and claimed to perform the same genre inference function, for example, between fonts or between machine and hand print species of characters. Referring to FIGS. 2 and 4, the general operation of the system is such that if the α English character along line 35 is a G, the β character along line 37 is a Cyrillic Д , and the γ numeral along line 39 is a 4, store 61, 62, 63 will transfer the matrices of joint probabilities in matrix 21, 58, 59 into the 2-dimensional working stores 85, 86, 87, respectively. Next, working store 85 with the β =Дcharacter along line 93 will cause a column of probability values in matrix 21 to be accessed from store 85 into the 1-dimensional working store 91. In a corresponding way, the γ = 4 on line 94 will access the single probability value in matrix 21 from store 91 to output register 64. This single probability is the probability value stored in matrix 21 at the intersection of the β and γ axes for their respective values Д and 4, respectively. In a corresponding way, the 2-dimensional stores 86, 87 are addressed by the α and γ characters along lines 95, 96 so as to access a 1-dimensional set of probability values from matrices 58, 59 into the 1-dimensional working stores 92, 93, respectively. The γ and α characters on lines 97, 99, cause the transfer of single probability values form matrices 58, 59 into registers 66, 67, respectively. As described previously, the joint conditional probability values $P_{MCC}$ sequentially stored in registers 64, 66, 67 are each sequentially multiplied in their respective multipliers 65, 68, 69. The multiplication process continues in chain fashion until the product of all of the conditional probabilities has been calculated for the English, Cyrillic, numeric subfields stored in shift registers 46, 49, 53, respectively. Comparator 77 then determines which of the products is the greatest in order to operate gate 78, 84, or 83, to allow the transmission of the characters in the correct subfield to output register 79.

While the invention has been particularly shown and described with referenced to the preferred embodiments thereof, it will be understood by those skilled in the art that the foregoing and other changes in form and details may be made therein without departing from the spirit and scope of the invention:

We claim:

1. A method for discriminating among $n>2$ genre character-sets within an alpha-numeric character field scanned by a character recognition machine adapted to scan characters in an alpha-numeric character field, and adapted to output along each of respective $n>2$ output lines associated $n>2$ genre character-set characters, each of which most nearly match a character scanned as a respective genre character-set character for all characters scanned in said character field, comprising the steps of:

storing in each of $n>2$ storage means connected to said $n>2$ output lines, a conditional probability that a certain respective genre character-set character was inferred by the character recognition machine given that the other genre character-set characters were scanned;

accessing said $n>2$ storage means to yield respective $n>2$ conditional probabilities that each respective genre character-set character inferred was misread by the character recognition machine;

multiplying all of the respective $n>2$ conditional probabilities separately for each of the genre character-sets inferred by the character recognition machine along the aforesaid $n>2$ output lines so as to develop respective $n>2$ total conditional probabilities; and comparing in a comparator the magnitudes of each of the $n>2$ total conditional probabilities so as to correlate the correct one of the genre character-set characters inferred by the character recognition machine with the greatest magnitude total conditional probability.

2. A method for discriminating among three genre character-sets within an alpha-numeric character field scanned by an optical character recognition machine (OCR) adapted to scan characters in an alpha-numeric character field, and adapted to output along each of three respective output lines associated genre character-set characters, each of which most nearly match a character scanned as a respective genre character-set character for all characters scanned in said character field, comprising the steps of:

storing in each of three storage means connected to said three output lines a conditional probability that a certain respective genre character-set character was inferred by the OCR given that the other genre character-set characters were scanned;

accessing said three storage means to yield three respective conditional probabilities that each respective genre character-set character inferred was misread by the OCR;

multiplying all of the three respective conditional probabilities separately for each of the genre character-sets inferred by the OCR along the three aforesaid output lines so as to develop three respective total conditional probabilities; and comparing in a comparator the magnitudes of each of the three total conditional probabilities so as to correlate the correct one of the genre character-set characters inferred by the OCR with the greatest magnitude total conditional probability.

3. A method for discriminating among a first alphabetic form and a second alphabetic form and a numeric form of a character field scanned by a character recognition machine adapted to scan characters in a character field, to output on a first output line an alphabetic character of the aforesaid first alphabetic form which most nearly matches each character scanned as an aforesaid first alphabetic form for all characters scanned in said character field, to output on a second output line an alphabetic character of the aforesaid second alphabetic form which most nearly matches each character scanned as an aforesaid second alphabetic form for all characters scanned in said character field, and to output on a third output line a numeric character which most nearly matches each character scanned as a numeric form for all characters scanned in said character field, comprising the steps of:

storing in a storage means connected to said first, second and third output lines, a first type of conditional probability that a certain alphabetic character of the aforesaid first alphabetic form was inferred by the character recognition machine given that certain aforesaid second alphabetic form and numeric characters were scanned, for combinations of alphabetic characters with numeric characters;

storing in said storage means a second type of conditional probability that a certain alphabetic character of the aforesaid second alphabetic form was inferred by the character recognition machine given that certain aforesaid first alphabetic form and numeric characters were scanned, for combinations of alphabetic characters with numeric characters;

storing in said storage means a third type of conditional probability that a certain numeric character was inferred by the character recognition machine given that certain aforesaid first and second alphabetic form characters were scanned, for combinations of alphabetic characters with numeric characters;

accessing said storage means by a first corresponding character trio in said alphabetic and numeric fields on said output lines to yield the aforesaid first type conditional probability that an alphabetic character of the aforesaid second alphabetic form on the second output line and a numeric character on the third output line were each misread by the character recognition machine as the corresponding alphabetic character of the aforesaid first alphabetic form characters on the first output line;

accessing said storage means by said first corresponding character trio in said alphabetic and numeric fields on said output lines to yield the aforesaid second type conditional probability that an alphabetic character of the aforesaid first alphabetic form on the first output line and a numeric character on the third output line were each misread by the character recognition machine as the corresponding aforesaid second alphabetic form and numeric characters on the second and third output lines;

accessing said storage means by said first corresponding character trio in said alphabetic and numeric fields on said output lines to yield the aforesaid third type conditional probability that an alphabetic character of the aforesaid first form on the first output line and an alphabetic character of the aforesaid second form on the second output line were each misread by a character recognition machine as the corresponding aforesaid first and second alphabetic form characters on the first and third output lines;

repeating said accessing steps for all of said corresponding character trios in said character field;

multiplying in a multiplier means having an input connected to said storage means, a first product of all the first type conditional probabilities accessed from said storage means for said character field, said first product being a first total conditional probability that all alphabetic characters of the aforesaid first alphabetic form outputted on said first output line were misread by the character recognition machine as the aforesaid second alphabetic and numeric characters outputted on said second and third output lines;

multiplying in said multiplier means, a second product of all the second type conditional probabilities accessed from said storage means, said second product being a second total conditional probability that alphabetic characters of the aforesaid second alphabetic form outputted on said second output line were misread by the character recognition machine as the aforesaid first alphabetic and numeric characters outputted on said first and third output lines;

multiplying in said multiplier means, a third product of all the third type conditional probabilities accessed from said storage means, said third product being a third total conditional probability that all numeric characters outputted on said third output line were misread by the character recognition machine as the aforesaid first and second alphabetic form characters outputted on said first and second output lines; and comparing in a comparator connected to said multiplier means, the magnitudes of said first, second, and third total conditional probabilities, and outputting therefrom an indication that the scanned character field is of the aforesaid first alphabetic form if said first total conditional probability is greater than said second or third total conditional probabilities, and is of the aforesaid second alphabetic form if said second total conditional probability is greater than said first or third total conditional probabilities, and is numeric if said third total conditional probability is greater than said first or second total conditional probabilities.

4. The method of claim 3 which further comprises:

gating a gating means having data inputs connected to said first, second and third output lines, a control input connected to the output of said comparator and an output connected to a fourth output line;

to selectively transmit to said fourth output line alphabetic character field of the aforesaid first alphabetic form outputted on said first output line, when said comparator outputs an indication that said first total conditional probability is greater than said second or third total conditional probabilities;

to selectively transmit to said fourth output line the aforesaid alphabetic character field of the aforesaid second alphabetic form outputted on said second output line, when said comparator outputs an indication that said second total conditional probability is greater than said first or third total conditional probabilities;

and to selectively transmit to said fourth output line the numeric field outputted on said third output line, when said comparator outputs an indication that said third total conditional probability is greater than said first or second total conditional probabilities.

5. The method of claim 4 further comprising the step of corresponding flagging the character field selectively transmitted to the aforesaid fourth output line as being of the aforesaid first alphabetic form, second alphabetic form, or numeric form.

6. In an apparatus for discriminating among $n>2$ genre character-sets within an alpha-numeric character field scanned by a character recognition machine adapted to scan characters in an alpha-numeric character field, and adapted to output along each of respective $n>2$ output lines associated $n>2$ genre character-set characters, each of which most nearly match a character scanned as a respective genre character-set character for all characters scanned in said character field:

storage means for storing respective $n>2$ conditional probabilities each of which infer that a certain respective genre character-set character was scanned by the character recognition machine given that the other genre character-set characters were scanned;

first circuit means connecting said output lines to the input of said storage means;

means for accessing said storage means to yield respective $n>2$ conditional probabilities that each respective genre character-set character inferred by said character recognition machine was misread by the character recognition machine;

multiplier means for multiplying all of the respective $n>2$ conditional probabilities separately for each of the genre character-sets inferred and outputted by the character recognition machine along the aforesaid $n>2$ output lines so as to develop respective $n>2$ total conditional probabilities;

second circuit means connecting the output of said storage means to the input of said multiplier means; comparator means;

third circuit means connecting the output of said multiplier means to said comparator means; and means for controlling the aforesaid means, within said discriminating apparatus, whereby the magnitudes of each of the $n>2$ total conditional probabilities are applied to said comparator means so as to correlate the correct one of the genre character-set characters inferred by the character recognition machine with the greatest magnitude total conditional probability.

7. An apparatus for discriminating among three genre character-sets within an alpha-numeric character field scanned by an optical character recognition (OCR) machine comprising:

an OCR adapted to scan characters in an alpha-numeric character field, and adapted to output along each of three respective output lines associated genre character-set characters, each of which most nearly match a scanned character as a respective genre character-set character for all characters scanned in said character field;

means connected to said three output lines for storing three respective conditional probabilities each of which infer that a certain respective genre character-set character was scanned by said OCR given that the other genre character-set characters were scanned;

means for accessing said storing means to yield three respective conditional probabilities that each respective genre character-set character inferred was misread by the OCR;

means connected to said storing means for multiplying all of the three respective conditional probabilities separately for each of the genre character-sets inferred by the OCR along the three aforesaid output lines so as to develop three respective total conditional probabilities; and means for comparing the magnitudes of each of the three total conditional probabilities so as to correlate the correct one of the genre character-set characters inferred by the OCR with the greatest magnitude total conditional probability.

8. An apparatus according to claim 7 additionally comprising:

means having an input and an output, connected at the input thereof to the three aforesaid output lines, for gating to the output thereof associated genre character-set characters corresponding to a character field along only one of the three said outputs; and means connected to said comparing means for controlling the output of said gating means to selectively transmit through said gating means the aforesaid correct one of the genre character-set characters inferred by the OCR with the greatest magnitude total conditional probability.

9. An apparatus for discriminating among a first alphabetic form and a second alphabetic form and the numeric form of an alpha-numeric character field scanned by a character recognition machine, comprising:

a character recognition machine adapted to scan the characters in a character field, to output on a first output line the alphabetic character of the aforesaid first alphabetic form which most nearly matches each character scaned, as of the aforesaid first alphabetic form for all characters scanned in said character field, to output on a second output line the alphabetic character of the aforesaid second alphabetic form which most nearly matches each character scanned, as of the aforesaid second alphabetic form for all characters scanned in said character field, and to output on a third output line a numeric character which most nearly matches each character scanned, as of a numeric form for all characters scanned in said character field;

a storage means connected to said output lines, having stored therein a first type of conditional probability that a certain alphabetic character of the aforesaid first alphabetic form was inferred by the character recognition machine given that a certain alphabetic character of the aforesaid second alphabetic form and a certain numeric character were each scanned, for combinations of alphabetic characters with numeric characters, said storage means being sequentially accessed by corresponding character trios in said alphabetic and numeric fields on said output lines to yield the first type conditional probability that an alphabetic character of the aforesaid second alphabetic form on the second output line and that a numeric character on the third output line were each misread by the character recognition machine as the corresponding alphabetic character on the first output line;

said storage means having stored therein a second type of conditional probability that a certain alphabetic character of the aforesaid second alphabetic form was inferred by the character recognition machine given that a certain alphabetic character of the aforesaid first character form and a certain numeric character were each scanned, for combinations of alphabetic characters with numeric characters, said storage means being sequentially accessed by corresponding character trios in said alphabetic and numeric fields on said output lines to yield the second type conditional probability that an alphabetic character of the aforesaid first alphabetic form on the first output line and that a numeric character on the third output line were each misread by the character recognition machine as the corresponding alphabetic character on the second output line;

said storage means having stored therein a third type of conditional probability that a certain numeric character was inferred by the character recognition machine given that a certain alphabetic character of the aforesaid first form and that a certain alphabetic character of the aforesaid second alphabetic form were each scanned, for combinations of alphabetic characters with numeric characters, said storage means being sequentially accessed by correponding character trios in said alphabetic and numeric fields on said output lines to yield the third type conditional probability that the alphabetic characters on the first and second output lines were each misread by the character recognition machine as the corresponding numeric character on the third output line;

a multiplier means having an input connected to said storage means for calculating a first product of all the first type conditional probabilities accessed from said storage means for said character field, said first product being a first total conditional probability that all alphabetic characters of the aforesaid second alphabetic form outputted on said second output line and that all numeric characters outputted on said third output line were each misread by the character recognition machine, for calculating a second product of all the second type conditional probabilities accessed from said storage means for said character field, said second product being a second total conditional probability that all alphabetic characters in the aforesaid first alphabetic form outputted on said first output line and that all numeric characters outputted on said third output line were each misread by the character recognition machine, and for calculating a third product of all the third type conditional probabilities accessed from said storage means, said third product being a third total conditional probability that the alphabetic characters outputted on said first and second output lines were each misread by the character recognition machine;

a comparator connected to said multiplier means for comparing the magnitudes of said first, second and third total conditional probabilities and outputting an indication that the scanned character field is alphabetic of the aforesaid first alphabetic form when said first total conditional probability is greater than said second or third total conditional probabilities, and is alphabetic of the aforesaid second alphabetic form when said second total conditional probability is greater than said first or third total conditional probabilities, and is numeric when said third total conditional probability is greater than said first or second total conditional probabilities.

10. The apparatus of claim 9 which further comprises:

a gating means having data inputs connected to said output lines, a control input connected to the output of said comparator and an output connected to a fourth output line for selectively transmitting to said fourth output line the alphabetic field of the aforesaid first alphabetic form outputted on said first output line when said comparator indicates the character field to be of the aforesaid first alphabetic form, for selectively transmitting to said fourth output line the alphabetic field of the aforesaid second alphabetic form outputted on said second output line when said comparator indicates the character field to be of the aforesaid second alphabetic form, and for selectively transmitting to said fourth output line the numeric field outputted on said third output line when said comparator indicates said scanned character field is numeric.

11. An apparatus according to claim 10 further comprising means controlled by said comparator for correspondingly flagging the character fields selectively transmitted to said fourth output line as being of the aforesaid first alphabetic form, second alphabetic form, or numeric form.

12. An apparatus according to claim 11 wherein said storage means comprises three 3-dimensional conditional probability stores, each of which is associated with a respective one of said first, second, and third output lines, and each of which has stored therein all of the conditional probabilities assigned to a given output line that the character inferred on that line resulted from the character recognition machine having scanned a character of another alpha-numeric character form;

said storage means further including three 2-dimensional working stores, the input of each connected to the output of a respective one of said 3-dimensional stores, each of the aforesaid 2-dimensional stores for storing a 2-dimensional array of conditional probabilities selectively transferred thereto from its respective 3-dimensional store consequent upon the identity of the alpha-numeric character on an aforesaid output line assigned to a given 3-dimensional working store;

said storage means additionally comprising three 1-dimensional working stores, the input of each of which is connected to the output of a respective one of said second-dimensional stores, each of said 1-dimensional stores for storing a 1-dimensional array of conditional probabilities selectively transferred from its respective 2-dimensional store;

circuit means for connecting said first output line to its respective 3-dimensional store, for connecting said second output line to the 2-dimensional store associated with its respective 3-dimensional store connected to said first output line, and for connecting said third output line connected to the 1-dimensional store associated with the 3-dimensional store connected to said first output line; and means for selecting a 2-dimensional array of conditional probabilities for transfer from said 3-dimensional store to its respective 2-dimensional store, consequent upon the identity of the character inferred by the character recognition machine on said first output line, for selectively transferring from the aforesaid 2-dimensional store to its respective 1-dimensional store, a selective 1-dimensional array of conditional probabilities consequent upon the identity of the character inferred by the character recognition machine on said second output line, and for selectively outputting from the aforesaid 1-dimensional store a single conditional probability consequent upon the identity of the character inferred by said character recognition machine on said third output line.

13. An apparatus according to claim 12 wherein each of three aforesaid 3-dimensional stores are connected to respective ones of said first, second and third outout lines; wherein each of three aforesaid 2-dimensional stores are connected to said second, third and first output lines so that each associated pair of 3-dimensional and 2-dimensional stores is connected to different ones of said output lines; and wherein each of three aforesaid 1-dimensional stores is connected to said third, first and second output lines so that each of three 3-dimensional, 2-dimensional and 1-dimensional branches of stores is connected to a respective one of said three output lines, to thereby yield at the outputs of each of said 1-dimensional stores the aforesaid first, second and third type conditional probabilities.

* * * * *